(12) United States Patent
Naik et al.

(10) Patent No.: US 11,106,261 B2
(45) Date of Patent: Aug. 31, 2021

(54) OPTIMAL OPERATING POINT ESTIMATOR FOR HARDWARE OPERATING UNDER A SHARED POWER/THERMAL CONSTRAINT

(71) Applicant: NVIDIA Corporation, Santa Clara, CA (US)

(72) Inventors: Aniket Naik, Fremont, CA (US); Siddharth Bhargav, Campbell, CA (US); Bardia Zandian, Santa Clara, CA (US); Narayan Kulshrestha, Fremont, CA (US); Amit Pabalkar, Fremont, CA (US); Arvind Gopalakrishnan, Fremont, CA (US); Justin Tai, San Jose, CA (US); Sachin Satish Idgunji, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 566 days.

(21) Appl. No.: 16/179,620

(22) Filed: Nov. 2, 2018

(65) Prior Publication Data
US 2020/0142466 A1 May 7, 2020

(51) Int. Cl.
*G06F 1/00* (2006.01)
*G06F 1/26* (2006.01)
(Continued)

(52) U.S. Cl.
CPC .............. *G06F 1/3206* (2013.01); *G06F 1/28* (2013.01); *G06F 1/3296* (2013.01);
(Continued)

(58) Field of Classification Search
CPC . G06F 1/28; G06F 1/206; G06F 1/324; G06F 1/3206; G06F 1/3243;
(Continued)

(56) References Cited

U.S. PATENT DOCUMENTS 7,913,071 B2    3/2011    Mallik et al.
8,706,652 B2    4/2014    Yang et al.
(Continued)

OTHER PUBLICATIONS

Jung et al., "Supervised Learning Based Power Management for Multicore Processors," IEEE Transactions on Computer-Aided Design of Integrated Circuits and Systems, vol. 29, No. 9, Aug. 19, 2010, pp. 1-14.
(Continued)

*Primary Examiner* — Nitin C Patel
(74) *Attorney, Agent, or Firm* — Zilka-Kotab, P.C.

(57) ABSTRACT

Integrated circuits, or computer chips, typically include multiple hardware components (e.g. memory, processors, etc.) operating under a shared power (e.g. thermal) constraint that is sourced by one or more power sources for the chip. Typically, the hardware components can be individually configured to operate at certain states (e.g. to operate at a certain frequency by setting a clock speed for a clock dedicated to the hardware component). Thus, each hardware component can be configured to operate at an operating point that is determined to be optimal, usually in terms of achieving some desired goal for a specific application (e.g. frame rates for gaming, etc.). In the context of chip hardware that operates under a shared power/thermal constraint, a method, computer readable medium, and system are provided for determining the optimal operating point for the chip that takes into consideration both performance of the chip and power consumption by the chip.

30 Claims, 14 Drawing Sheets

(51) Int. Cl.
*G06F 1/3206* (2019.01)
*G06F 9/50* (2006.01)
*G06F 1/3296* (2019.01)
*G06F 1/28* (2006.01)
*G06N 20/00* (2019.01)
*G06N 5/04* (2006.01)

(52) U.S. Cl.
CPC ........... *G06F 9/5094* (2013.01); *G06N 20/00* (2019.01); *G06N 5/04* (2013.01)

(58) Field of Classification Search
CPC .... G06F 1/3296; G06F 9/4893; G06F 9/5094; G06N 20/00; G06N 3/0454; G06N 3/08; G06N 5/04; Y02D 10/00
See application file for complete search history.

(56) References Cited

U.S. PATENT DOCUMENTS

| | | | |
|---|---|---|---|
| 8,756,442 B2 | 6/2014 | Naffziger et al. | |
| 8,832,485 B2 | 9/2014 | Branover et al. | |
| 8,924,758 B2 | 12/2014 | Steinman et al. | |
| 8,959,372 B2 | 2/2015 | Branover et al. | |
| 9,026,817 B2 | 5/2015 | Min et al. | |
| 9,286,222 B2 | 3/2016 | Greenhalgh | |
| 9,910,481 B2 | 3/2018 | Lee et al. | |
| 10,649,518 B2 * | 5/2020 | Kwon | G06F 1/3234 |
| 2008/0028246 A1 * | 1/2008 | Witham | G06F 1/3203 713/330 |
| 2012/0005505 A1 | 1/2012 | Tolia et al. | |
| 2012/0023345 A1 | 1/2012 | Naffziger et al. | |
| 2013/0246820 A1 | 9/2013 | Branover et al. | |
| 2016/0139649 A1 | 5/2016 | Kim | |
| 2016/0239074 A1 | 8/2016 | Lee et al. | |
| 2016/0378168 A1 | 12/2016 | Branover et al. | |
| 2017/0031430 A1 * | 2/2017 | Ansorregui | G06F 1/3206 |
| 2017/0187592 A1 | 6/2017 | Ghosh et al. | |
| 2017/0205863 A1 | 7/2017 | Lee et al. | |
| 2018/0046238 A1 | 2/2018 | Ruan et al. | |
| 2018/0164864 A1 | 6/2018 | Peffers et al. | |
| 2018/0210530 A1 | 7/2018 | Kwon et al. | |
| 2019/0041969 A1 | 2/2019 | Nge et al. | |

OTHER PUBLICATIONS

Shen et al., "Achieving Autonomous Power Management Using Reinforcement Learning," ACM Transactions on Design Automation of Electronic Systems, vol. 18, No. 2, Mar. 2013, pp. 24:1-24:32.

Tan et al., "Adaptive Power Management Using Reinforcement Learning," IEEE/ACM International Conference on Computer-Aided Design Digest of Technical Papers, Nov. 2009, pp. 461-467.

* cited by examiner

OPTIMAL OPERATING POINT ESTIMATOR FOR HARDWARE OPERATING UNDER A SHARED POWER/THERMAL CONSTRAINT

FIELD OF THE INVENTION

The present invention relates to hardware components operating under a shared power (e.g. thermal) constraint, and in particular configuring operation of hardware components operating under the shared power constraint.

BACKGROUND

Integrated circuits, or computer chips, typically include multiple hardware components operating under a shared power (e.g. thermal) constraint. The power/thermal constraint may be defined by the thermal design power (TDP) of the chip, and thus may be sourced by one or more power sources for the chip [e.g. graphics processing unit (GPU) power source, dynamic random access memory (DRAM) power source]. The hardware components that operate under the shared power/thermal constraint can be memory, processors, etc. and can be individually configured to operate at certain states within particular operating constraints of the hardware component. For example, memory can be configured to operate at a certain frequency, by setting a clock speed of a clock dedicated to the memory. Similarly, a processor, such as a GPU, can be configured to operate at a certain frequency, by setting a clock speed of a clock dedicated to the processor.

Due to the configurable nature of the above mentioned hardware components, algorithms have been developed to determine the particular configuration of a hardware component that achieves some desired performance for a particular application. For example, in a graphics intensive application, such as a game, the processor can be configured to operate at a high frequency in order to increase the frames per second (FPS) computational capability of the processor which can improve the graphics experience for a user. However, while current algorithms can determine an optimal operating point of various hardware components in terms of performance in a particular application, these algorithms are generally inefficient in optimally reducing the power consumed by the hardware components at the "optimal" operating point. Thus, while performance may be improved, it will oftentimes be at the expense of increased power consumption.

There is a need for addressing these issues and/or other issues associated with the prior art.

SUMMARY

A method, computer readable medium, and system are disclosed for an optimal operating point estimator for chip hardware operating under a shared power/thermal constraint, that takes into consideration both performance and power. In use, input is received that is associated with workloads executed on a chip having two or more hardware components that operate under a shared power constraint. The input includes descriptions of the workloads, performance metrics of each of the two or more hardware components when executing each of the workloads, and power consumption metrics for each of the workloads. Additionally, an artificial intelligence (AI) network is trained that correlates the descriptions of the workloads, the performance metrics for each of the workloads, and the power consumption by each of the workloads. Further, a selection is received of an optimization mode for the chip that considers both performance and power. Still yet, the AI network is used to determine an optimal operating point of the chip, according to the selected optimization mode. Moreover, the chip is configured to operate at the determined optimal operating point.

DETAILED DESCRIPTION

Integrated circuits, or computer chips, typically include multiple hardware components (e.g. memory, processors, etc.) operating under a shared power (e.g. thermal) constraint that is sourced by one or more power sources for the chip. Typically, the hardware components can be individually configured to operate at certain states (e.g. to operate at a certain frequency by setting a clock speed for a clock dedicated to the hardware component). Thus, each hardware component can be configured to operate at an operating point that is determined to be optimal, usually in terms of achieving some desired goal for a specific application (e.g. frame rates for gaming, etc.).

In the context of chip hardware that operates under a shared power/thermal constraint, a method, computer readable medium, and system are provided for an optimal operating point estimator that determines the optimal operating point for the chip by taking into consideration both performance of the chip and power consumption by the chip. In particular, the optimal operating point estimator is able to determine, for a combination of hardware components sharing the power/thermal constraint, the optimal operating states and voltage state of those hardware components which balance both performance and power consumption. Furthermore, the optimal operating point estimator employs an artificial intelligence (AI) network, which can be a machine learning network or deep learning network, to make the optimal operating point determination.

Figure 1:
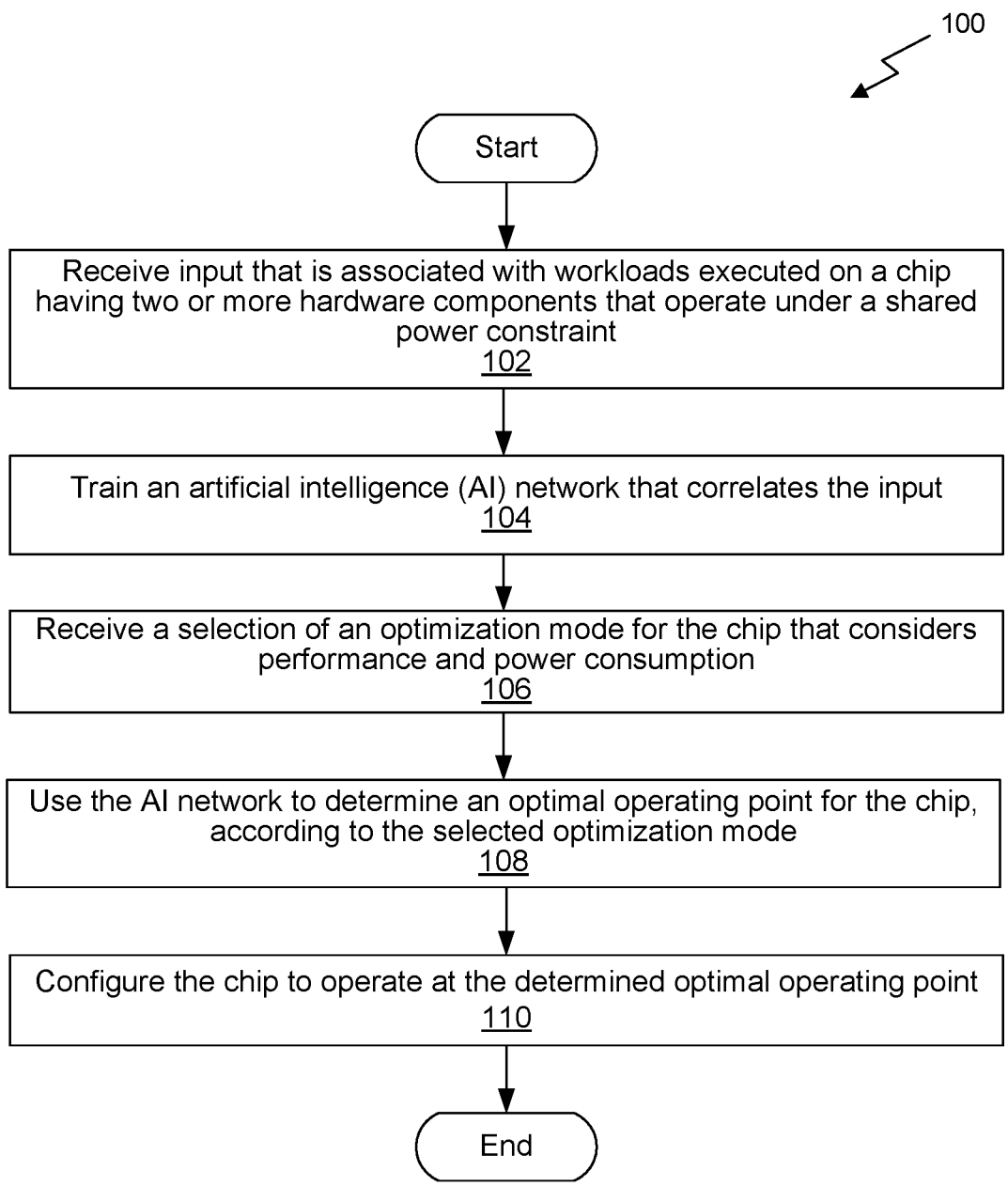
FIG. 1 illustrates a flowchart of a method of an optimal operating point estimator for chip hardware operating under a shared power/thermal constraint, that takes into consideration both performance and power, in accordance with an embodiment.

FIG. 1 illustrates a flowchart of a method 100 of an optimal operating point estimator for chip hardware operating under a shared power/thermal constraint, that takes into consideration both performance and power, in accordance with an embodiment. In various embodiments, the method 100 may be performed, and thus the optimal operating point estimator implemented, using a processing unit, a program, custom circuitry, or a combination of custom circuitry and a program. For example, the method 100 may be executed by a GPU (graphics processing unit), CPU (central processing unit), and/or in the context of the any of the hardware embodiments described below. Furthermore, persons of ordinary skill in the art will understand that any system that performs method 100 is within the scope and spirit of embodiments of the present invention.

In operation 102, input is received that is associated with workloads executed on a chip having two or more hardware components that operate under a shared power constraint. The input includes descriptions of the workloads (e.g. for each workload, an indication of an application executing the workload, operations performed within the workload, data on which the workload is performed, or any other description that can be used as a unique identifier of the workload), performance metrics (e.g. processing capabilities of the chip such as frame time, frames per second, instructions per second, etc.) of each of the two or more hardware components when executing each of the workloads, and power consumption metrics (e.g. an amount of power consumed by each hardware component to perform the workload, a total amount of power consumed by the two or more hardware components to perform the workload, etc.) for each of the workloads.

In the context of the present description, the chip may be any integrated circuit (IC) having two or more hardware components that operate under a shared power (e.g. thermal) constraint and that are capable of being utilized for executing workloads (e.g. processes, operations, etc.). For example, the hardware components may each be memory, such as dynamic random access memory (DRAM), and a processor, such as a graphics processing unit (GPU), a central processing unit (CPU), etc. Additionally, the shared power constraint refer to an amount of power available to the hardware components and may be sourced by one or more power sources for the chip, such as a GPU power source, a DRAM power source, etc.

As noted above, the input that is associated with workloads executed on the chip is received (e.g. captured or otherwise accumulated). It should be noted that the workloads can be executed for different applications, such as crypto currency applications, gaming applications, compute applications, etc., and may be processes of those applications, operations performed by those applications, etc. In addition, the input can be accumulated by capture logic over a predefined window of time. For example, for graphics workloads involving frame rendering operations, the input can be captured over an entire frame, and for compute workloads involving computational operations or deep learning workloads involving deep learning operations, the input can be captured at a function call level or over a fixed period of time.

Additionally, in operation 104, an artificial intelligence (AI) network is trained that correlates the descriptions of the workloads, the performance metrics for each of the workloads, and the power consumption by each of the workloads. The AI network may be a machine learning network or machine learning model based on trees of shallow predictors, or a deep learning network, in various embodiments. In any case, the trained AI network correlates each description of a particular workload with the power consumption metrics for the particular workload and performance metrics for the particular workload.

Further, in operation 106, a selection is received of an optimization mode for the chip that considers performance and power consumption. In one embodiment the selection indicates: a parameter for which to optimize operation of the chip (e.g. performance, power, or efficiency), and optionally a target value for the parameter. Thus, in one embodiment, the selected optimization mode may be to optimize operation of the chip for performance, and the selection may include a target value for the performance. In another embodiment, the selected optimization mode may be to optimize operation of the chip for power, and the selection may include a target value for the power. In yet another embodiment, the selected optimization mode may be to optimize operation of the chip for efficiency. The selection may be made by a user, or automatically based on predetermined criteria, rules, or the particular application for which the optimization is performed.

Still yet, in operation 108, the AI network is used to determine an optimal operating point of the chip, according to the selected optimization mode. Using the AI network in this manner may include deploying the AI network on the chip, in one embodiment. For example, the AI network may be deployed by running the AI network on the chip for determining the optimal operating point of the chip. As an option, the AI network may run by a CPU of the chip to determine the optimal operating point of the chip. As another example, the AI network may be run by dedicated hardware of the chip for determining the optimal operating point of the chip. Of course, its should be noted that the AI network may be used by any computer processor, computer logic, and/or computer program for determining the optimal operating point of the chip.

When the selected optimization mode is to optimize operation of the chip for performance, the optimal operating point of the chip may be determined by identifying the target value for the performance and a power threshold, and using the AI network to determine the optimal operating point for the chip to maximize performance without exceeding the power threshold. As noted above, the target value for the performance is specified when the optimization mode is selected. As an option, the power threshold may also be specified when the optimization mode is selected, or as another option may be specified separately (e.g. by a user, or automatically based on predetermined criteria, rules, the particular application for which the optimization is performed, etc.).

In the context of the present embodiment, the optimal operating point for the chip includes operating states (e.g. clock frequencies) for each hardware component of the two or more hardware components and a voltage state (e.g.

voltage input) for the two or more hardware components. In order to maximize performance without exceeding the power threshold, the optimal operating point may be selected whereby operation of the chip comes as close as possible to the target value for the performance without the power threshold being exceeded. As mentioned above, the AI network is used to determine the optimal operating point for the chip. This may include, for example, the above described correlations made by the AI network being referenced to determine the operating states and voltage state for the hardware components that maximize performance without exceeding the power threshold.

When the selected optimization mode is to optimize operation of the chip for power, the optimal operating point of the chip may be determined by identifying the target value for the power and a performance threshold, and using the AI network to determine the optimal operating point for the chip to minimize power consumption without falling below the performance threshold. As noted above, the target value for the power is specified when the optimization mode is selected. As an option, the performance threshold may also be specified when the optimization mode is selected, or as another option may be specified separately (e.g. by a user, or automatically based on predetermined criteria, rules, or the particular application for which the optimization is performed).

Again, in the context of the present embodiment, the optimal operating point for the chip includes operating states (e.g. clock frequencies) for each hardware component of the two or more hardware components and a voltage state (e.g. voltage input) for the two or more hardware components. In order to minimize power consumption without falling below the performance threshold, the optimal operating point may be selected whereby operation of the chip comes as close as possible to the target value for the power without falling below the performance threshold. As mentioned above, the AI network is used to determine the optimal operating point for the chip. This may include, for example, the above described correlations made by the AI network being referenced to determine the operating states and voltage state for the hardware components that minimize power consumption without falling below the performance threshold.

When the selected optimization mode is to optimize operation of the chip for efficiency, the optimal operating point of the chip may be determined by identifying an efficiency threshold, where the efficiency threshold is defined based on a change in performance in relation to a change in power consumption, and further using the AI network to determine the optimal operating point for the chip to maximize performance without falling below the efficiency threshold. For example, the determined operating point may be one that provides an optimal performance at an operating power, where the operating point is determined based on performance and the point on an efficiency curve where the efficiency diminishes beyond a certain set operating voltage and frequency. Again, the optimal operating point for the chip may include operating states for each hardware component of the two or more hardware components and a voltage state for the two or more hardware components.

Moreover, in operation 110, the chip is configured to operate at the determined optimal operating point. In other words, the two or more hardware are configured to operate at the determined respective operating states and at the voltage state.

In this way, in the context of the chip which operates under a shared power/thermal constraint, the method 100 may determine the optimal operating point for the chip by taking into consideration both performance of the chip and power consumption by the chip. In particular, for a combination of hardware components of the chip sharing the power/thermal constraint, the optimal operating states and voltage state of those hardware components may be determined which balance both performance and power consumption.

For example, the operating point estimator may allow the GPU of a chip to save power while delivering similar performance to those provided by prior art systems, thus improving battery life, or lifetime power cost for plugged-in systems. As another example, for power constrained cases such as chips operating under Nvidia's Max-Q operating conditions, the operating point estimator can improve performance by optimal selection of the operating point for the chip, depending on the nature of the workload. As yet another example, in deep learning applications where there are memory bottlenecked phases (similar to mining), the operating point estimator may lower performance and reduce power during those phases and then boost performance and power during other phases to improve overall performance under the same power budget.

Additionally, by using the AI network, the operating point of the chip can be rapidly adjusted to reach the target performance or power value. The maximum speed of change in the operating point of the chip may depend on the latency of the AI network, and the latency may be reduced when deployed on dedicated hardware of the chip. Further, by adjusting the operating point as needed, static power limits for certain chips may be avoided and static chip configurations per application may also be avoided.

The operating point estimator may also correctly cap clocks of the hardware components in cases where bottlenecks do not allow the performance to actually scale with higher clock frequencies, which will ensure that power is not wasted without improving performance. Still yet, since the operating point estimator utilizes fine-grain telemetry from the chip (e.g. for workloads per frame, etc.) the operating point estimator can accurately determine the optimal operating point of the chip, such for chips operating under Nvidia's Max-Q operating conditions.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 2A:
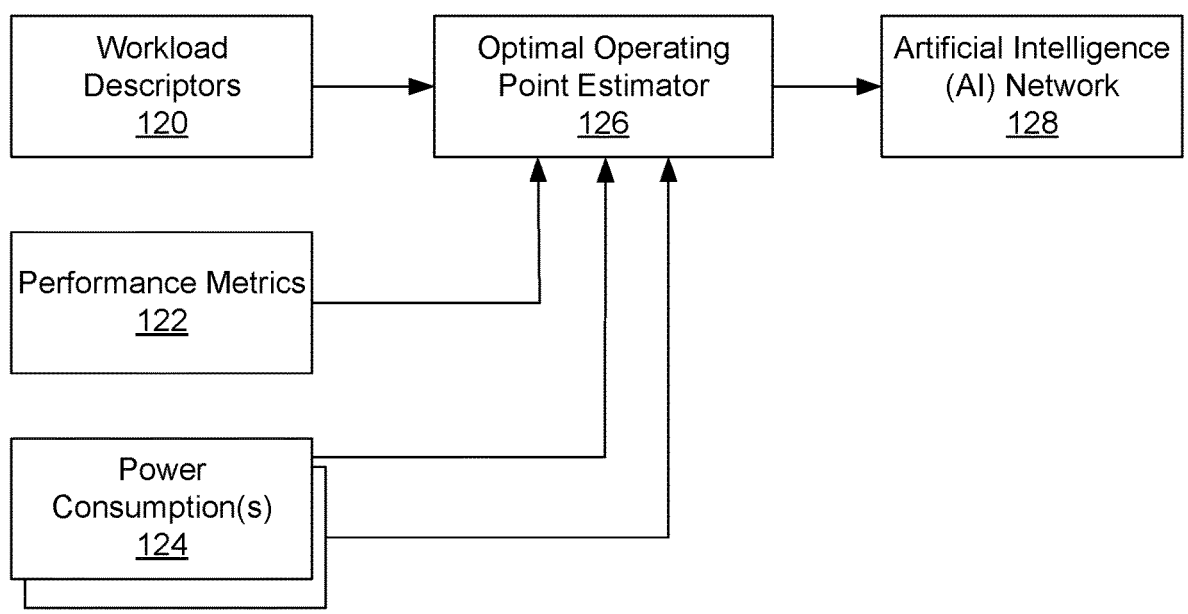
FIG. 2A illustrates a block diagram of the training phase of an optimal operating point estimator, in accordance with an embodiment.

FIG. 2A illustrates a block diagram of the training phase of an optimal operating point estimator, in accordance with an embodiment. As an option, the training phase may be performed offline with respect to the chip for which the training phase is being performed.

Initially, the optimal operating point estimator 126 executes a training phase, in which the AI network 128 is trained for a chip having two or more hardware components that operate under a shared power constraint. The hardware components can be memory (e.g. DRAM), a processing unit (e.g. GPU etc.), or any other hardware integrated within the chip. The AI network 128 is trained by the optimal operating point estimator 126 using inputs associated with workloads executed on the chip. The inputs include descriptions of the workloads 120, performance metrics (e.g. frame times, etc.) of each of the hardware components when executing each of the workloads 122, and power consumption metrics (e.g.

power consumption by each hardware component, total power consumption, etc.) for each of the workloads 124.

It should be noted that the workloads can be executed for different applications, such as crypto currency applications, gaming applications, compute applications, etc. In addition, the inputs 120, 122, 124 can be accumulated by capture logic of the operating point estimator 126 over a predefined window of time. For example, for graphics workloads, the inputs 120, 122, 124 can be captured over an entire frame, and for compute or deep learning workloads, the inputs 120, 122, 124 can be captured at a function call level or over a fixed period of time.

In one embodiment, the AI network 128 is trained to correlate particular workload descriptions with power consumption metrics and performance metrics. For example, the AI network 128 may learn the power consumption by the chip for a particular workload (specified by description) as well as the performance of the chip for the particular workload. In this embodiment, for a given workload description, the trained AI network 128 can output the power consumption metrics and performance metrics correlated therewith.

In another embodiment, in addition to training the AI network 128 to correlate particular workload descriptions with power consumption metrics and performance metrics, as described above, the AI network 128 may also be trained to determine, based on the inputs 120, 122, 124, an optimal operating point for the chip. For example, for each possible optimization mode for the chip, the AI network 128 may learn the optimal operating point of the chip for a particular workload, based on the power consumption metrics and performance metrics correlated therewith. In this embodiment, for a given workload description and optimization mode, the trained AI network 128 can output the optimal operating point for the chip.

In conjunction with the training phase, the optimal operating point estimator 126 may receive a selection of an optimization mode (not shown) for the chip, namely an indication of whether to optimize operation of the chip for performance, power, or efficiency. The selected optimization mode may also indicate a threshold value. For example, when the optimization mode indicates to optimize operation of the chip for performance, the threshold value may be for power, such that performance of the chip is to be maximized towards a target value without exceeding the power threshold. As another example, when the optimization mode indicates to optimize operation of the chip for power, the threshold value may be for performance, such that power consumption by the chip is minimized toward a target value without falling below the performance threshold. As yet another embodiment, when the optimization mode indicates to optimize operation of the chip for efficiency, the threshold value may be for the efficiency (change in performance/ change in power), such that performance of the chip is to be maximized (e.g. toward a target performance value) without falling below the efficiency threshold. Of course, it should be noted that in other embodiments the optimization mode may be received by the optimal operating point estimator 126 independent of the training phase.

After the training phase, the optimal operating point estimator 126 then executes a deployment phase, in which the AI network 128 is deployed on the chip to determine the optimal operating point of the chip and to configure the chip accordingly. Optionally, the deployment phase may be performed online. For example, the deployment phase can be executed as software by a CPU of the chip, or can be executed through dedicated hardware on the chip.

By applying the concept of temporal locality, where workloads executed in close temporal proximity are assumed to be similar (e.g. exhibit similar properties), the operating point estimator 126 uses a description of one or more prior workloads executed by the chip to determine from the AI network 128 the optimal operating point of the chip to be employed when executing a subsequent workload. To this end, the deployment phase, or at least the determination of the optimal operating point and the corresponding configuration of the chip, can be repeated for each new workload (e.g. frame). As another option, the deployment phase, or at least the determination of the optimal operating point and the corresponding configuration of the chip, can be repeated during workload execution at various predefined operating points within an application.

Various embodiments of the deployment phase will now be described with reference to FIGS. 2B-2D.

Figure 2B:
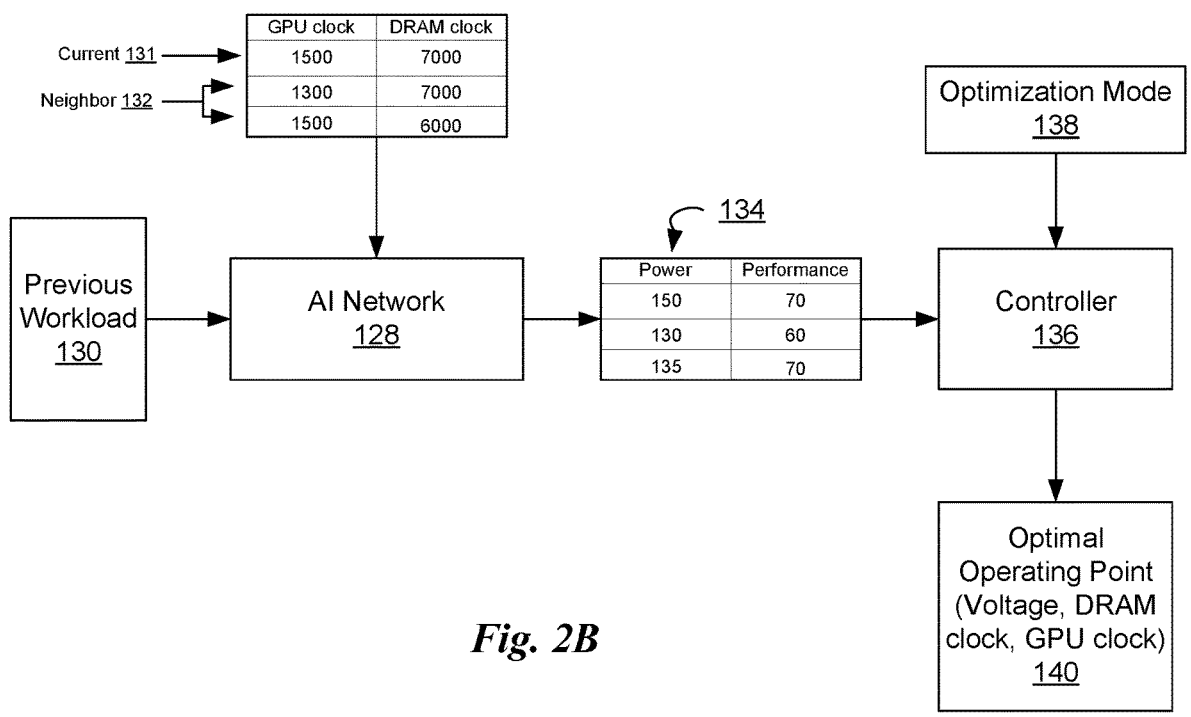
FIG. 2B illustrates a block diagram of a first mode for the deployment phase of an optimal operating point estimator, in accordance with an embodiment.

FIG. 2B illustrates a block diagram of a first mode for the deployment phase of an optimal operating point estimator, in accordance with an embodiment. In the first mode for the deployment phase, the optimal operating point estimator uses a controller 136 independent of the AI network 128 to determine the optimal operating point of the chip and to configure the chip accordingly.

As shown, the AI network 128 is queried with input including a description of a previous workload executed on the chip 130, the actual operating point of the chip when executing the previous workload 131, and select neighboring operating points for the chip 132. The AI network 128 outputs, in response the query, a list 134 of possible performance metrics and power metrics that correspond to each of the input operating points. The controller 136, external to the AI network 128, then selects the optimal operating point 140 from the list 134 output from the AI network 128, based on the selected optimization mode 138. The controller 136 further configures the chip to operate at the optimal operating point 140, or otherwise causes other hardware and/or software to configure the chip to operate at the optimal operating point 140.

Figure 2C:
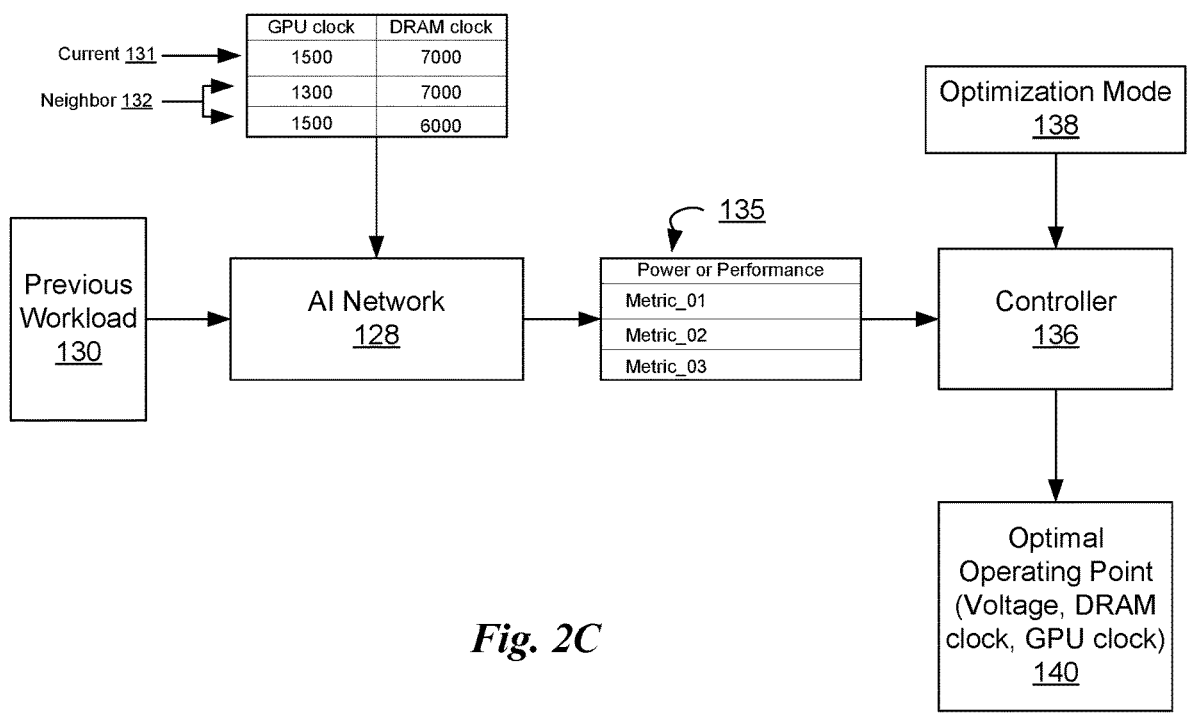
FIG. 2C illustrates a block diagram of a second mode for the deployment phase of an optimal operating point estimator, in accordance with an embodiment.

FIG. 2C illustrates a block diagram of a second mode for the deployment phase of an optimal operating point estimator, in accordance with an embodiment. The second mode for the deployment phase operates the same as the first mode for the deployment phase described in FIG. 2B, except the AI network 128 outputs, in response the query, a list 134 of possible performance metrics OR power metrics that correspond to each of the input operating points. The controller 136, external to the AI network 128, then selects one of the metrics in the list and uses this metric to setup the other operating point parameter, based on the selected optimization mode 138. For example, if the AI network 128 outputs a list of operating frequencies, then the controller may select one of the operating frequencies in the list, and then determine from the selected operating frequency a corresponding operating voltage. The controller 136 further configures the chip to operate at the optimal operating point 140, or otherwise causes other hardware and/or software to configure the chip to operate at the optimal operating point 140.

Figure 2D:
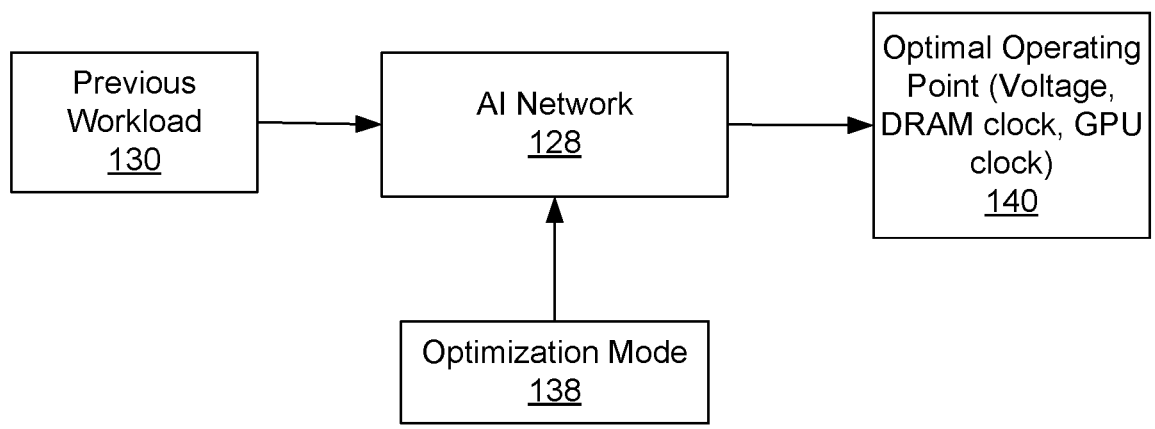
FIG. 2D illustrates a block diagram of a third mode for the deployment phase of an optimal operating point estimator, in accordance with an embodiment.

FIG. 2D illustrates a block diagram of a third mode for the deployment phase of an optimal operating point estimator, in accordance with an embodiment. In the third mode for the deployment phase, the AI network 128 determines the optimal operating point of the chip and configures the chip accordingly.

During deployment of the AI network 128, the AI network 128 is queried with input including a description of a previous workload executed on the chip 130 and the optimization mode 138. The AI network 128 then outputs, in response the query, the optimal operating point 140 for the chip. The optimal operating point 140 output by the AI network 128 received by hardware and/or software which configures the chip to operate at the optimal operating point 140.

Figure 2E:
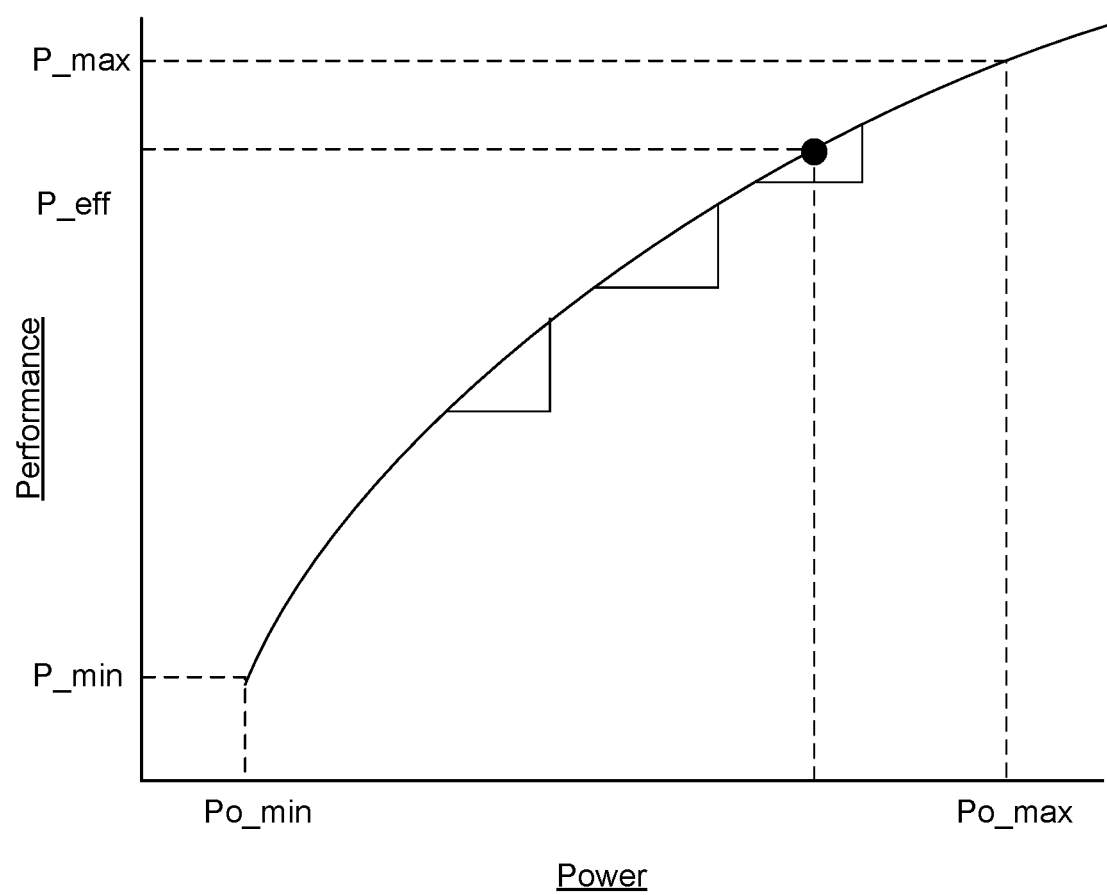
FIG. 2E illustrates an efficiency curve for determining an optimal operating point for the efficiency optimization mode, in accordance with an embodiment.

FIG. 2E illustrates an efficiency curve for determining an optimal operating point for the efficiency optimization mode described above. As shown, the operating point that provides an optimal performance at an operating power is determined, where the operating point is determined based on performance and a point on the efficiency curve where the efficiency, or increase in performance (dPerf) relative the change in power consumption (dPower), diminishes beyond a certain set operating voltage and frequency. In FIG. 2E, this point is indicated by the slope of the tangent on the efficiency curve.

Figure 2F:
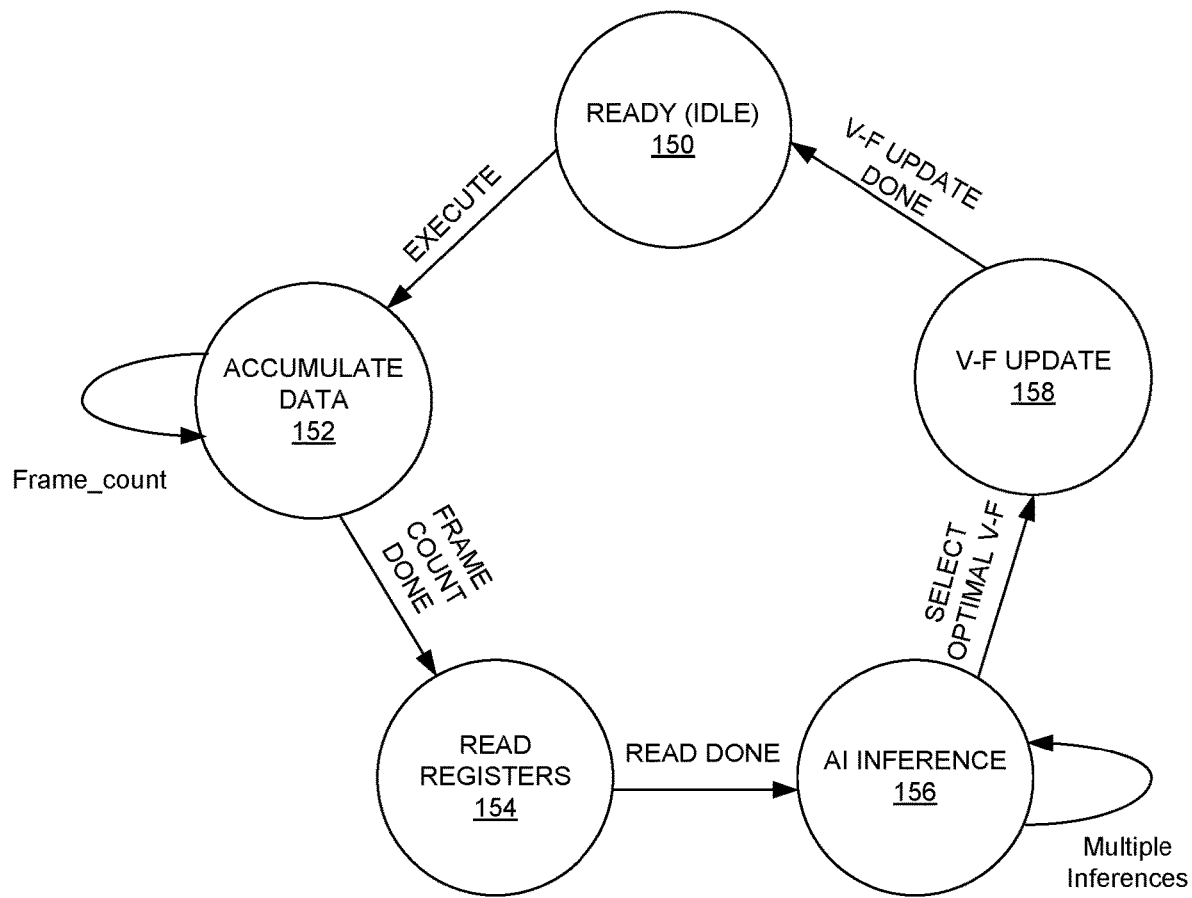
FIG. 2F illustrates state machine operation for an operating point estimator, in accordance with an embodiment.

FIG. 2F illustrates state machine operation for an operating point estimator, in accordance with an embodiment. After an initial Ready (Idle) state 150, an execute command is issued to Accumulate Data 152. The Data includes descriptions of workloads most recently executed on the chip, performance metrics of each of hardware components when executing each of the workloads, and power consumption metrics for each of the workloads. In the embodiment shown, the Data is accumulated over a certain number of frames (e.g. frame_count).

Once the Data is accumulated, a Data Read 154 is performed where the accumulated Data is read from memory. Once the Data is read, an AI Inference 156 is made using the read Data. The AI Inference 156 may be repeated to generate a list of possible performance metrics and power metrics that correspond to the Data. For example, the AI Inference 156 may be performed for an actual operating point of the chip when executing a previous workload, and select neighboring operating points for the chip. The AI Inference 156 may thus include a list of possible performance metrics and power metrics that correspond to each of the operating points included in the Data. A controller selects, from the output of the AI Inference 156, an optimal V-F Update 158 for the chip, which is the optimal operating point (voltage and frequency) for the chip, and the chip is transitioned to the selected optimal operating point. Once the chip is transitioned to the selected optimal operating point, the state machine returns to the Ready (Idle) state 150 and waits for the next execute command.

Parallel Processing Architecture

Figure 3:
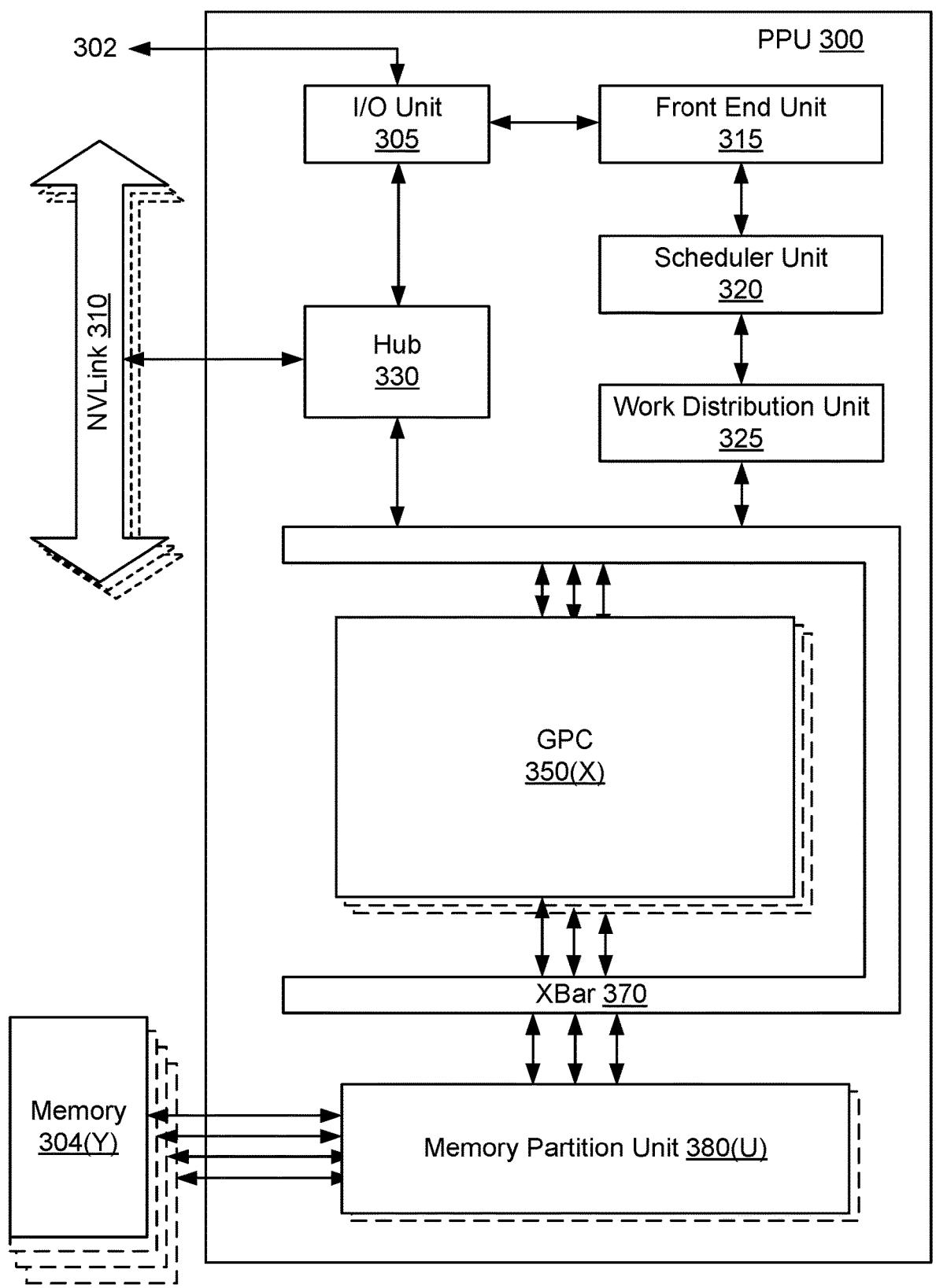
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 304 or CPU via the NVLink 310. In an embodiment, the PPU 300 includes a number U of partition units 380 that is equal to the number of separate and distinct memory devices 304 coupled to the PPU 300. A partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
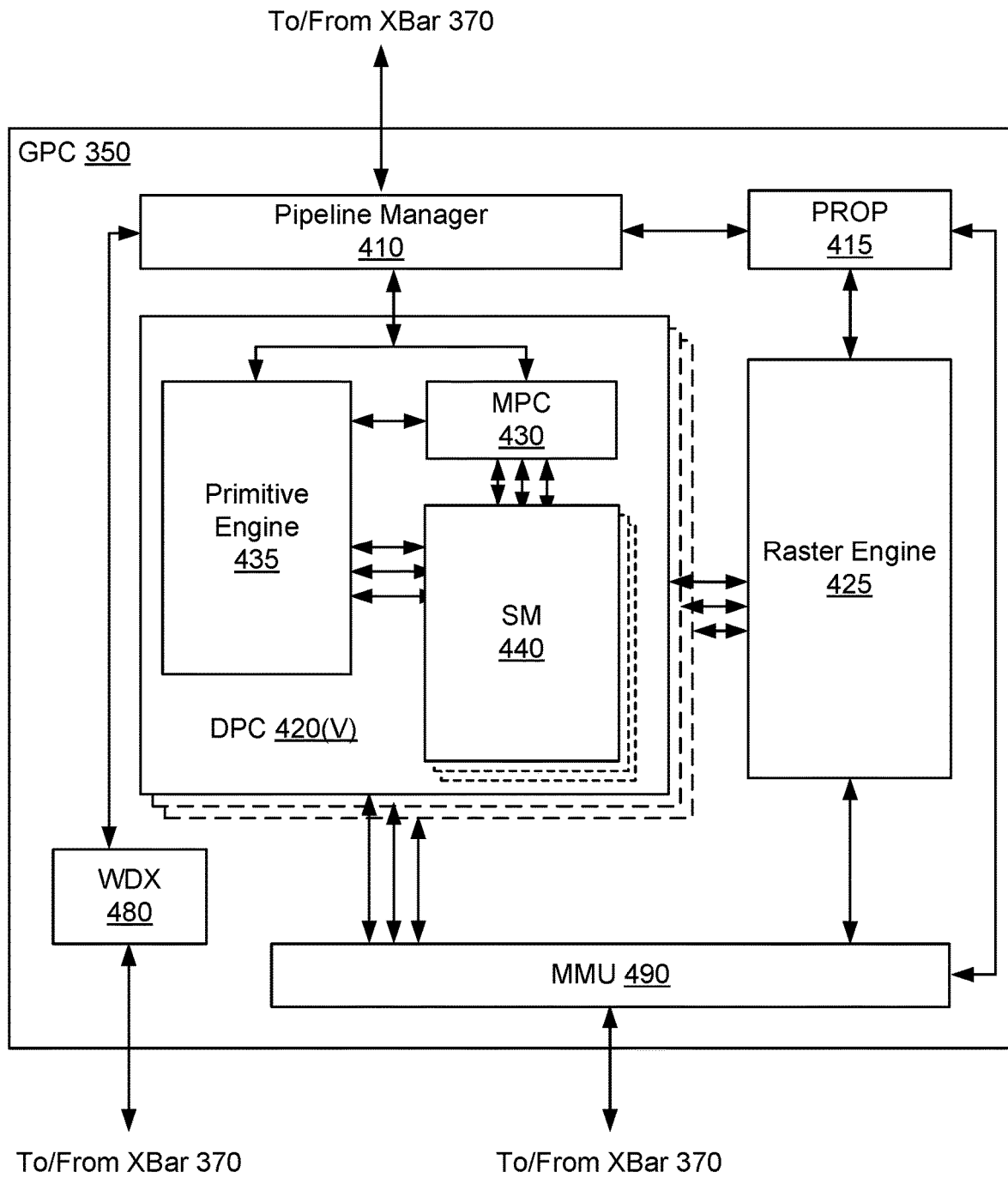
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
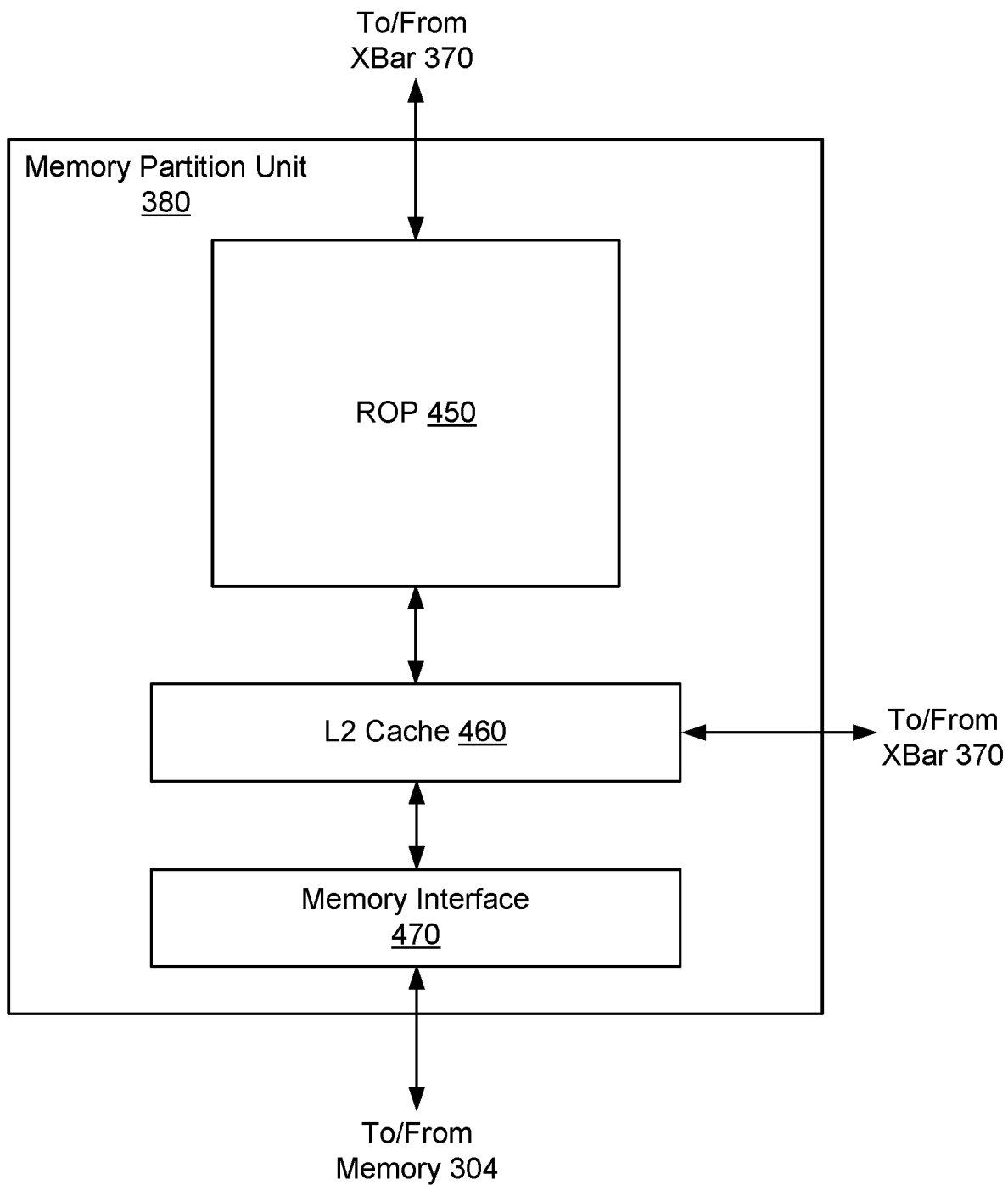
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of partition units 380, where each pair of partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
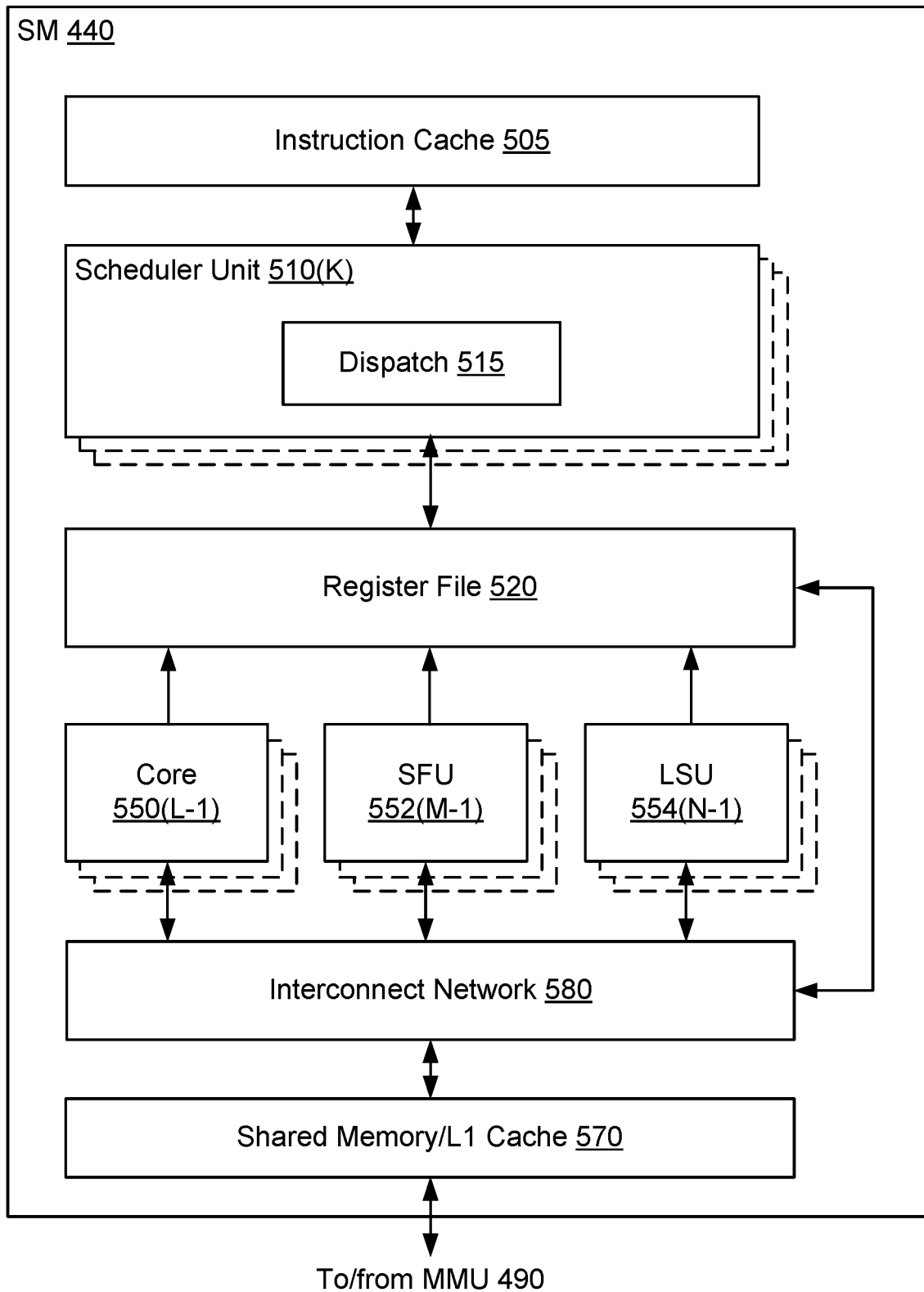
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
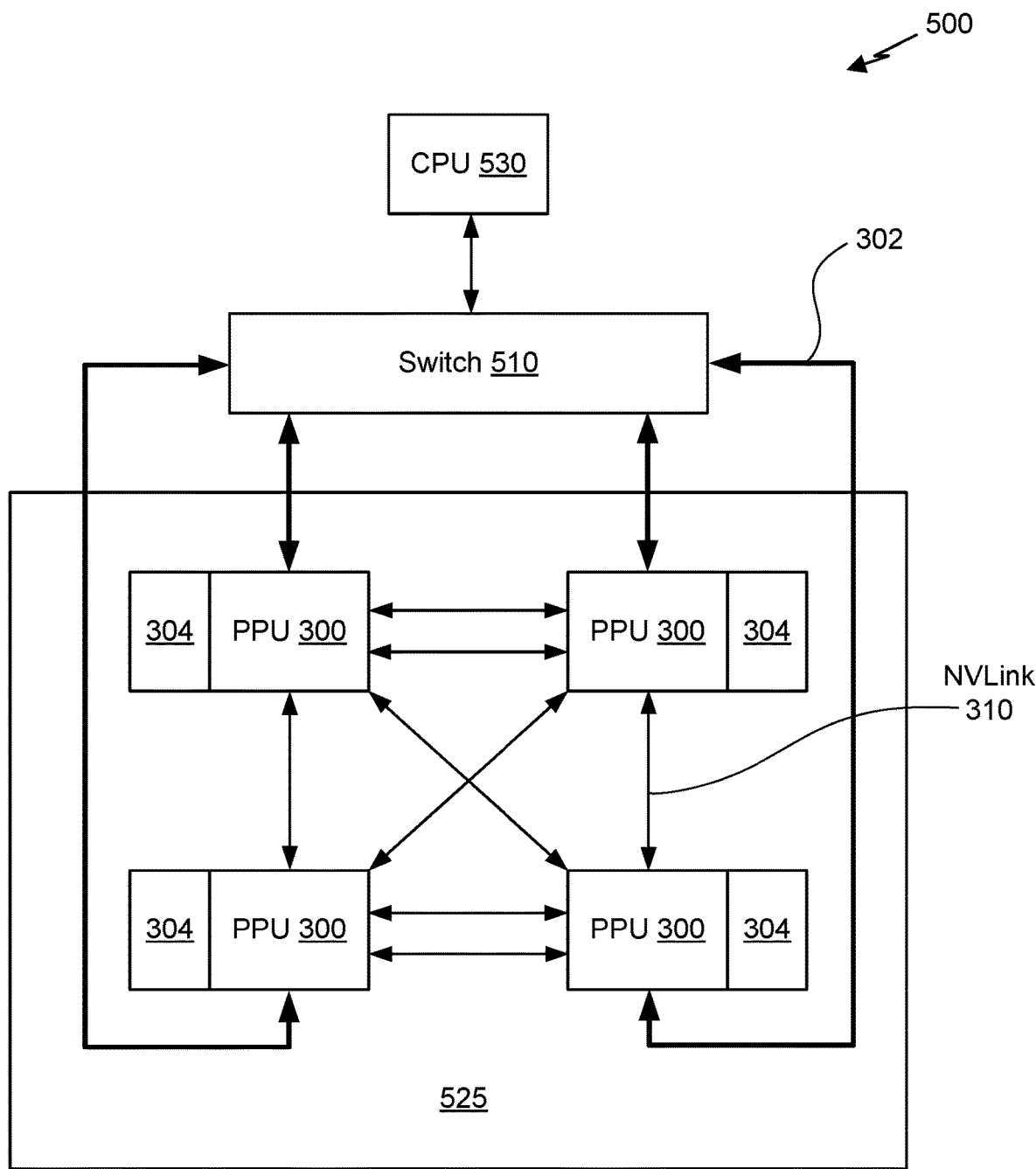
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the method 100 shown in FIG. 1. The processing system 500 includes a CPU 530, switch 510, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
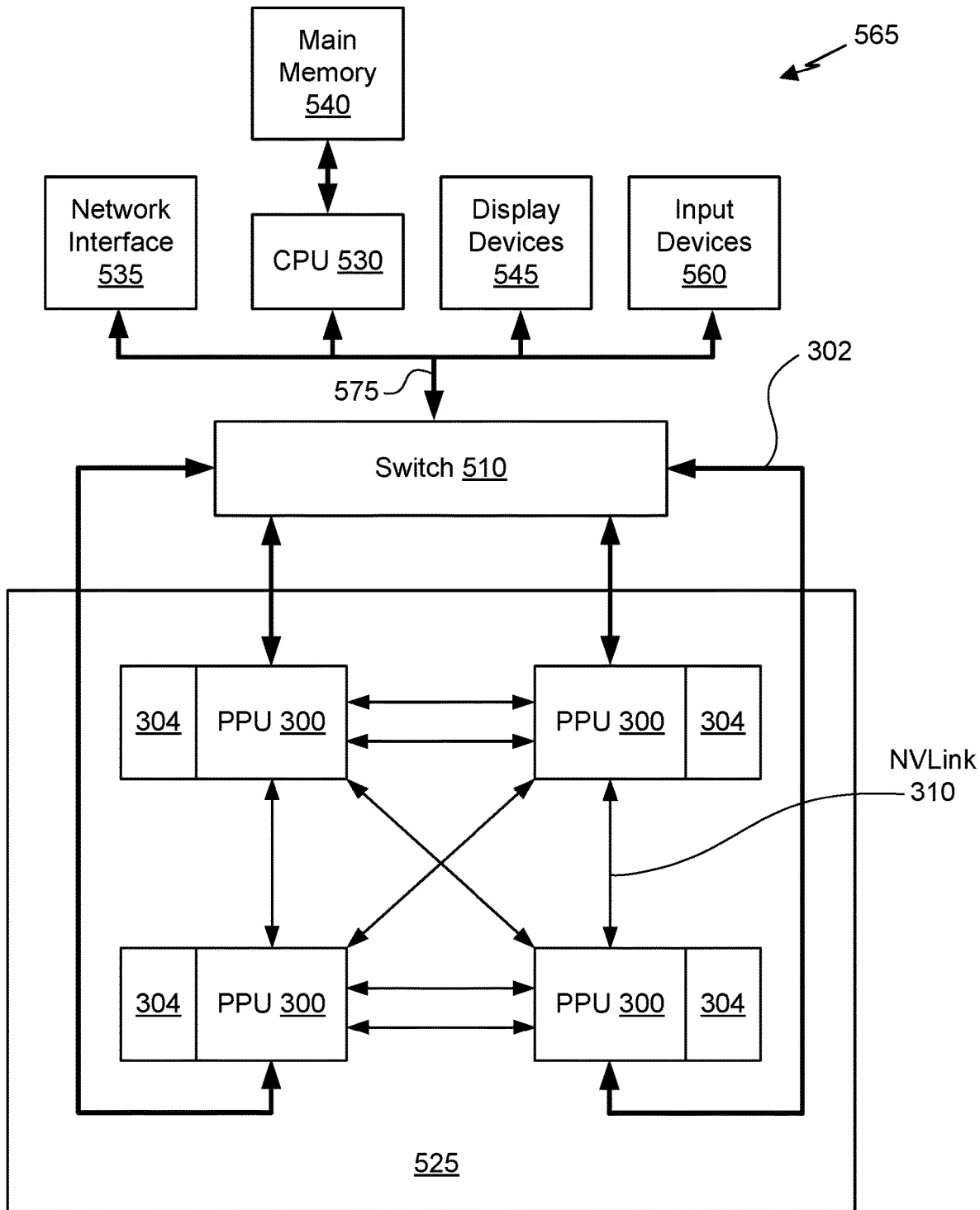
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 100 shown in FIG. 1.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (e.g., pixel data for each of the pixels of the display).

An application writes model data for a scene (e.g., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (e.g., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6:
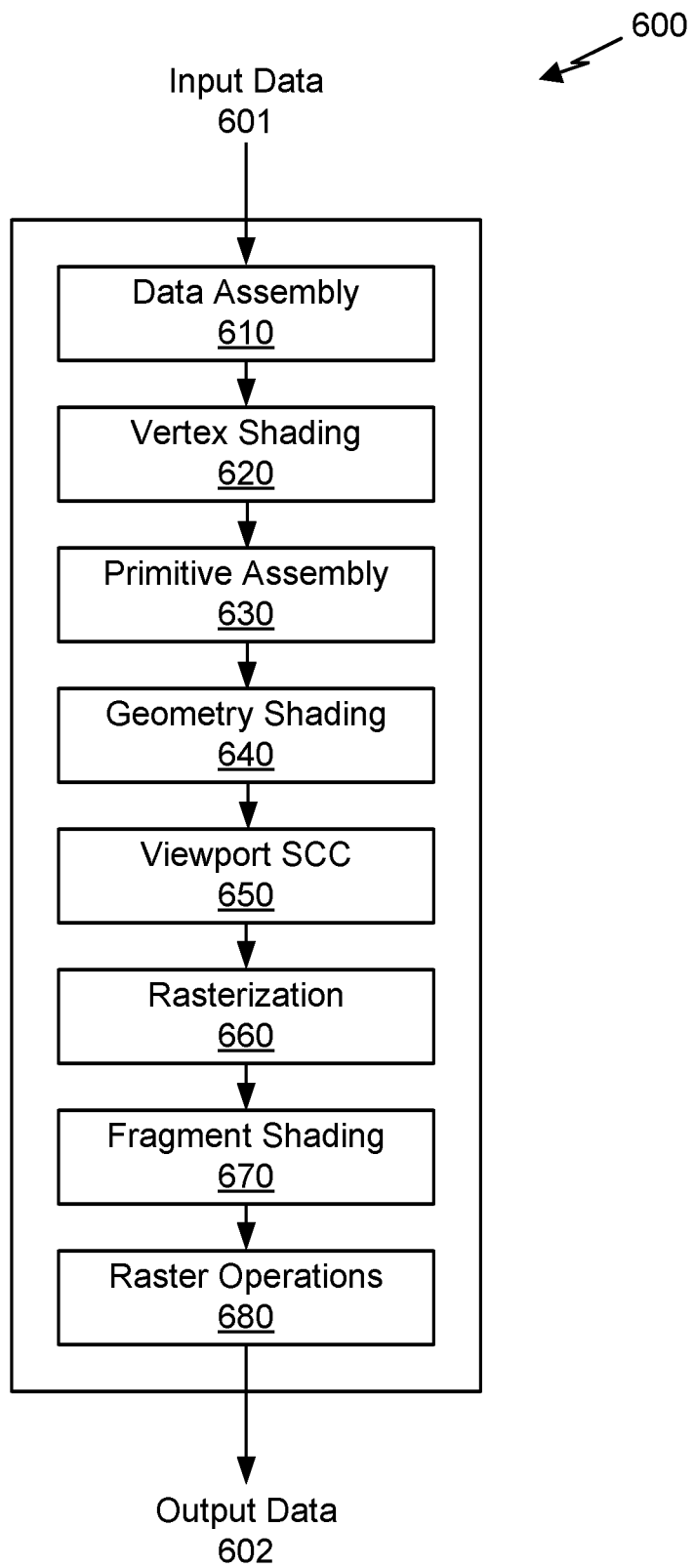
FIG. 6 is a conceptual diagram of a graphics processing pipeline implemented by the PPU of FIG. 3, in accordance with an embodiment.

FIG. 6 is a conceptual diagram of a graphics processing pipeline 600 implemented by the PPU 300 of FIG. 3, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 300. Other stages of the graphics processing pipeline 600 may be implemented by programmable hardware units such as the SM 440 of the PPU 300.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In an embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one SM 440 (or multiple SMs 440). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on an SM 440.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

What is claimed is:

1. A method, comprising:
   receiving input associated with workloads executed on a chip having two or more hardware components that operate under a shared power constraint, the input including:
     descriptions of the workloads,
     performance metrics of each of the two or more hardware components when executing each of the workloads, and
     power consumption metrics for each of the workloads;
   training an artificial intelligence (AI) network that correlates the descriptions of the workloads, the performance metrics for each of the workloads, and the power consumption by each of the workloads;
   receiving a selection of an optimization mode for the chip that considers both performance and power consumption;
   determining using the AI network an optimal operating point of the chip, according to the selected optimization mode; and
   configuring the chip to operate at the determined optimal operating point.

2. The method of claim 1, wherein the two or more hardware components include memory and a processor.

3. The method of claim 2, wherein the memory is DRAM and the processor is a GPU.

4. The method of claim 1, wherein the input is accumulated by capture logic over a predefined window of time.

5. The method of claim 4, wherein for graphics workloads, the input is captured over an entire frame.

6. The method of claim 4, wherein for compute or deep learning workloads, the input is captured at a function call level or over a fixed period of time.

7. The method of claim 1, wherein each of the descriptions of the workloads includes at least one of:
   an indication of an application executing a workload,
   operations performed within the workload, or
   data on which the workload is performed.

8. The method of claim 1, wherein the performance metrics include a frame time.

9. The method of claim 1, wherein the performance metrics include instructions per second.

10. The method of claim 1, wherein the power consumption metrics for each of the workloads includes an amount of power consumed by each hardware component to perform the workload.

11. The method of claim 1, wherein the power consumption metrics for each of the workloads includes a total amount of power consumed by the two or more hardware components to perform the workload.

12. The method of claim 1, wherein the selection of the optimization mode for the chip indicates:
   a parameter for which to optimize operation of the chip, the parameter being one of performance, power, or efficiency.

13. The method of claim 12, wherein determining the optimal operating point of the chip, according to the selected optimization mode, includes:
   when the selected optimization mode is to optimize operation of the chip for performance:
     identifying the target value for the performance,
     identifying a power threshold,
     using the AI network to determine the optimal operating point for the chip to maximize performance without exceeding the power threshold, the optimal operating point for the chip including operating states for each hardware component of the two or more hardware components and a voltage state for the two or more hardware components.

14. The method of claim 12, wherein determining the optimal operating point of the chip, according to the selected optimization mode, includes:
   when the selected optimization mode is to optimize operation of the chip for power:
     identifying the target value for the power,
     identifying a performance threshold,
   using the AI network to determine the optimal operating point for the chip to minimize power consumption without falling below the performance threshold, the optimal operating point for the chip including operating states for each hardware component of the two or more hardware components and a voltage state for the two or more hardware components.

15. The method of claim 12, wherein determining the optimal operating point of the chip, according to the selected optimization mode, includes:
   when the selected optimization mode is to optimize operation of the chip for efficiency:
     identifying an efficiency threshold, wherein the efficiency threshold is defined based on a change in performance in relation to a change in power consumption,
     using the AI network to determine the optimal operating point for the chip to maximize performance without falling below the efficiency threshold, the optimal operating point for the chip including operating states for each hardware component of the two or more hardware components and a voltage state for the two or more hardware components.

16. The method of claim 1, wherein the optimal operating point of the chip includes operating states for each hardware component of the two or more hardware components, the operating states including clock frequencies for each hardware component of the two or more hardware components and a voltage state for the two or more hardware components.

17. The method of claim 1, where the optimal operating point of the chip is determined based on a description of one or more prior workloads executed by the chip, and is employed when executing a subsequent workload on the chip.

18. The method of claim 1, wherein the determining of the optimal operating point of the chip and the configuring the chip to operate at the determined optimal operating point are repeated:
    for each new workload executed on the chip, or
    during workload execution at various predefined operating points within an application.

19. The method of claim 1, wherein the determining of the optimal operating point of the chip and the configuring the chip to operate at the determined optimal operating point are performed by software executed by a CPU of the chip.

20. The method of claim 1, wherein the determining of the optimal operating point of the chip and the configuring the chip to operate at the determined optimal operating point are performed by dedicated hardware on the chip.

21. A non-transitory computer readable medium storing code executable by a processor to perform a method comprising:
    receiving input associated with workloads executed on a chip having two or more hardware components that operate under a shared power constraint, the input including:
        descriptions of the workloads,
        performance metrics of each of the two or more hardware components when executing each of the workloads, and
        power consumption metrics for each of the workloads;
    training an artificial intelligence (AI) network that correlates the descriptions of the workloads, the performance metrics for each of the workloads, and the power consumption by each of the workloads;
    receiving a selection of an optimization mode for the chip that considers both performance and power consumption;
    determining using the AI network an optimal operating point of the chip, according to the selected optimization mode; and
    configuring the chip to operate at the determined optimal operating point.

22. The non-transitory computer readable medium of claim 21, wherein the two or more hardware components include memory and a processor.

23. The non-transitory computer readable medium of claim 21, wherein the optimal operating point of the chip includes operating states for each hardware component of the two or more hardware components, the operating states including clock frequencies for each hardware component of the two or more hardware components and a voltage state for the two or more hardware components.

24. The non-transitory computer readable medium of claim 21, where the optimal operating point of the chip is determined based on a description of one or more prior workloads executed by the chip, and is employed when executing a subsequent workload on the chip.

25. The non-transitory computer readable medium of claim 21, wherein the determining of the optimal operating point of the chip and the configuring the chip to operate at the determined optimal operating point are repeated:
    for each new workload executed on the chip, or
    during workload execution at various predefined operating points within an application.

26. A chip, comprising:
    two or more hardware components that operate under a shared power constraint; and
    dedicated hardware for:
    receiving input associated with workloads executed on the chip, the input including:
        descriptions of the workloads,
        performance metrics of each of the two or more hardware components when executing each of the workloads, and
        power consumption metrics for each of the workloads;
    training an artificial intelligence (AI) network that correlates the descriptions of the workloads, the performance metrics for each of the workloads, and the power consumption by each of the workloads;
    receiving a selection of an optimization mode for the chip that considers both performance and power consumption;
    determining using the AI network an optimal operating point of the chip, according to the selected optimization mode; and
    configuring the chip to operate at the determined optimal operating point.

27. The chip of claim 26, wherein the two or more hardware components include memory and a processor.

28. The chip of claim 26, wherein the optimal operating point of the chip includes operating states for each hardware component of the two or more hardware components, the operating states including clock frequencies for each hardware component of the two or more hardware components and a voltage state for the two or more hardware components.

29. The chip of claim 26, where the optimal operating point of the chip is determined based on a description of one or more prior workloads executed by the chip, and is employed when executing a subsequent workload on the chip.

30. The chip of claim 26, wherein the determining of the optimal operating point of the chip and the configuring the chip to operate at the determined optimal operating point are repeated:
    for each new workload executed on the chip, or
    during workload execution at various predefined operating points within an application.

* * * * *